(12) United States Patent
Hu

(10) Patent No.: US 11,231,589 B2
(45) Date of Patent: Jan. 25, 2022

(54) ULTRALIGHT WEARABLE DISPLAY DEVICE

(71) Applicant: Darwin Hu, San Jose, CA (US)

(72) Inventor: Darwin Hu, San Jose, CA (US)

( * ) Notice: Subject to any disclaimer, the term of this patent is extended or adjusted under 35 U.S.C. 154(b) by 0 days.

(21) Appl. No.: 17/315,302

(22) Filed: May 8, 2021

(65) Prior Publication Data
US 2021/0263322 A1 Aug. 26, 2021

Related U.S. Application Data

(63) Continuation-in-part of application No. 15/996,518, filed on Jun. 3, 2018, now Pat. No. 11,002,967, which is a continuation-in-part of application No. 15/944,691, filed on Apr. 3, 2018, now abandoned, which is a continuation of application No.
(Continued)

(51) Int. Cl.
| | |
|---|---|
| G02B 27/01 | (2006.01) |
| G02B 27/00 | (2006.01) |
| G02B 6/42 | (2006.01) |
| G02B 6/44 | (2006.01) |
| G06F 3/01 | (2006.01) |
| F21V 8/00 | (2006.01) |

(Continued)

(52) U.S. Cl.
CPC ......... *G02B 27/0172* (2013.01); *G02B 6/003* (2013.01); *G02B 6/0006* (2013.01); *G02B 6/0008* (2013.01); *G02B 6/0035* (2013.01); *G02B 6/4204* (2013.01); *G02B 6/443* (2013.01); *G02B 6/4471* (2013.01); *G02B 27/0093* (2013.01); *G06F 1/163* (2013.01); *G06F 3/011* (2013.01); *G06F 3/013* (2013.01); *G02B 3/14* (2013.01); *G02B 2027/011* (2013.01); *G02B 2027/014* (2013.01); *G02B 2027/0125* (2013.01); *G02B 2027/0138* (2013.01); *G02B 2027/0178* (2013.01); *G02B 2027/0187* (2013.01)

(58) Field of Classification Search
CPC combination set(s) only.
See application file for complete search history.

(56) References Cited

U.S. PATENT DOCUMENTS

2011/0199582 A1* 8/2011 Kuriki .................. H04N 9/3155
353/31
2014/0333734 A1* 11/2014 Yang .................... H04N 13/363
348/53

(Continued)

*Primary Examiner* — Krishna P Neupane
(74) *Attorney, Agent, or Firm* — Joe Zheng

(57) ABSTRACT

Techniques for reducing weight on wearable display devices are described. In one embodiment of the present invention, a wearable display device includes no electronic components and is coupled to an enclosure by a transmission line including only one or more optical fibers, where the fiber is responsible for transporting the content or an optical image from one end of the optical fiber to another end thereof by total internal reflections within the fiber. The optical image is picked up by a focal lens from a microdisplay in the enclosure. The optical image is in lower resolution but received by the optical fiber at a twice speed as the normal refresh rate (e.g., 120 Hz vs. 60 Hz). Two successive images in lower resolution are combined at or near the other end of the optical fiber to generate a combined image at higher resolution, where the combined image is refreshed and perceived at the normal refresh rate.

14 Claims, 21 Drawing Sheets

Related U.S. Application Data

15/372,957, filed on Dec. 8, 2016, now Pat. No. 9,946,075.

(51) Int. Cl.
*G06F 1/16* (2006.01)
*G02B 3/14* (2006.01)

(56) References Cited

U.S. PATENT DOCUMENTS

| | | | |
|---|---|---|---|
| 2016/0025984 A1* | 1/2016 | Hino | H04N 13/339 345/8 |
| 2017/0097507 A1* | 4/2017 | Yeoh | G02B 26/103 |
| 2018/0061301 A1* | 3/2018 | Hu | G09G 3/3607 |

* cited by examiner

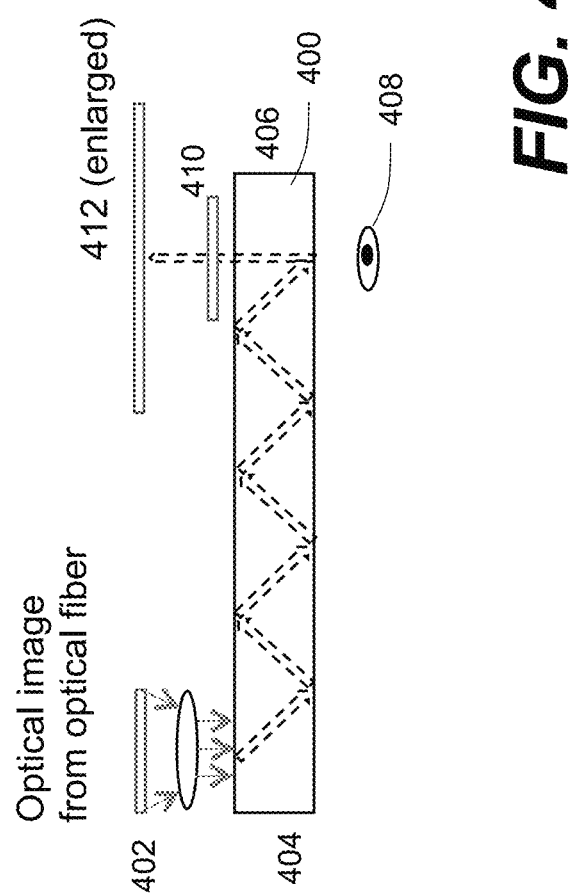

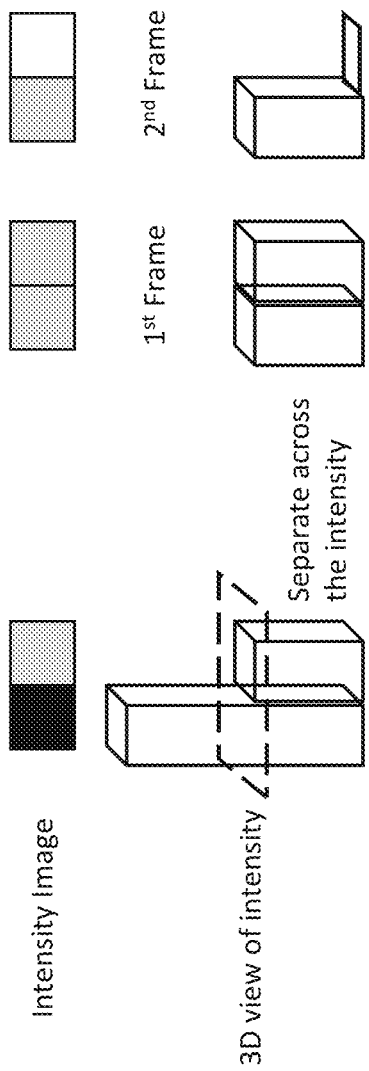

ULTRALIGHT WEARABLE DISPLAY DEVICE

BACKGROUND OF THE INVENTION

Field of the Invention

The present invention generally relates to the area of display devices and particularly relates to architecture and designs of display devices, where a display device is made in form of a pair of glasses, and may be used in various applications including virtual reality and augmented reality. More particularly, the present invention employs thinner optical fibers to transport optical images across the glasses to further reduce the weight of the glasses and minimize possible impact of transmission lines between the glasses and a supporting device commonly attached to or carried by a user of the glasses.

Description of the Related Art

Virtual Reality or VR is generally defined as a realistic and immersive simulation of a three-dimensional environment created using interactive software and hardware, and experienced or controlled by movement of the body. A person using virtual reality equipment is typically able to look around the artificially generated three-dimensional environment, moves around in it and interacts with features or items that are depicted on a screen or in goggles. Virtual realities artificially create sensory experiences, which can include sight, touch, hearing, and, less commonly, smell.

Augmented reality (AR) is a technology that layers computer-generated enhancements atop an existing reality in order to make it more meaningful through the ability to interact with it. AR is developed into apps and used on mobile devices to blend digital components into the real world in such a way that they enhance one another, but can also be told apart easily. AR technology is quickly coming into the mainstream. It is used to display score overlays on telecasted sports games and pop out 3D emails, photos or text messages on mobile devices. Leaders of the tech industry are also using AR to do amazing and revolutionary things with holograms and motion activated commands.

The delivery methods of Virtual Reality and Augmented Reality are different when viewed separately. Most 2016-era virtual realities are displayed either on a computer monitor, a projector screen, or with a virtual reality headset (also called head-mounted display or HMD). HMDs typically take the form of head-mounted goggles with a screen in front of the eyes. Virtual Reality actually brings the user into the digital world by cutting off outside stimuli. In this way user is solely focusing on the digital content being displayed in the HMDs. Augmented reality is being used more and more in mobile devices such as laptops, smart phones, and tablets to change how the real world and digital images, graphics intersect and interact.

In reality, it is not always VR vs. AR as they do not always operate independently of one another, and in fact are often blended together to generate an even more immersing experience. For example, haptic feedback, which is the vibration and sensation added to interaction with graphics, is considered an augmentation. However, it is commonly used within a virtual reality setting in order to make the experience more lifelike though touch.

Virtual reality and augmented reality are great examples of experiences and interactions fueled by the desire to become immersed in a simulated land for entertainment and play, or to add a new dimension of interaction between digital devices and the real world. Alone or blended together, they are undoubtedly opening up worlds, both real and virtual alike.

FIG. 1A shows an exemplary goggle now commonly seen in the market for the application of delivering or displaying VR or AR. No matter how a goggle is designed, it appears bulky and heavy, and causes inconvenience when worn on a user. Further most of the goggles cannot be seen through. In other words, when a user wears a goggle, he or she would not be able to see or do anything else. Thus, there is a need for an apparatus that can display the VR and AR but also allows a user to perform other tasks if needed.

Various wearable devices for VR/AR and holographic applications are being developed. FIG. 1B shows a sketch of HoloLens from Microsoft. It weights 579 g (>1.2 lbs). With the weight, a wearer won't feel comfortable when wearing it for a period. Indeed, what is available in the market is generally heavy and bulky in comparison to normal glasses (25 g~100 g). It is reported that the wearable devices based on HoleLens will be supplied to US army. If ever equipped on soldiers, the weight of the wearable device may potentially impact the movements of the soldiers that have to move swiftly in battlefields. Thus there is still another need for a wearable AR/VR viewing or display device that looks similar to a pair of regular glasses but is also amenable to smaller footprint, enhanced impact performance, lower cost packaging, and easier manufacturing process.

Many glasses-like display devices employ a common design of positioning image forming components (such as LCOS) near the front or lens frames, hoping to reduce transmission loss of images and use less components. However, such a design often makes a glasses-like display device unbalanced, the front part is much heavier than the rear part of the glasses-like display device, adding some pressure on a nose. There is thus still another need to distribute the weight of such a display device when worn on a user.

Regardless how a wearable display device is designed, there are many components, wires and even batteries that must be used to make the display device function and operable. While there have been great efforts to move as many parts as possible to an attachable device or enclosure to drive the display device from a user's waist or pocket, the essential parts, such as copper wires, must be used to transmit various control signals and image data. The wires, often in form of a cable, do have a weight, which adds a pressure on a wearer when wearing such a display device. There is yet another need for a transmission medium that can be as light as possible without sacrificing the needed functions.

There are many other needs that are not to be listed individually but can be readily appreciated by those skilled in the art that these needs are clearly met by one or more embodiments of the present invention detailed herein.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to architecture and designs of wearable devices that may be for virtual reality and augmented reality applications. According to one aspect of the present invention, a display device is made in form of a pair of glasses and includes a minimum number of parts to reduce the complexity and weight thereof. A separate case or enclosure is provided as portable to be affixed or attached to a user (e.g., a pocket or waist belt). The enclosure includes all necessary parts and circuits to generate content for virtual reality and augmented reality applications, resulting in a minimum number of parts needed on the glasses, hence smaller footprint, enhanced impact performance, lower cost packaging, and easier manufacturing process of the glasses. The content is optically picked up by an optical cable and transported by optical fibers in the optical cable to the glasses, where the content is projected respectively to the lenses specially made for displaying the content before the eyes of the wearer.

According to another aspect of the present invention, the glasses include no electronic components and are coupled to the enclosure by a transmission line including only one or more the optical fibers (interchangeably referred to as fiber or fibers hereinafter), where the fiber is responsible for transporting the content or an optical image from one end of the optical fiber to another end thereof by total internal reflections within the fiber. The optical image is picked up by a focal lens from a microdisplay in the enclosure.

According to still another aspect of the present invention, the optical image is in lower resolution but received by the optical fiber at a twice speed as the normal refresh rate (e.g., 120 Hz vs. 60 Hz). Two successive images in lower resolution are combined at or near the other end of the optical fiber to generate a combined image at higher resolution, where the combined is refreshed at the normal refresh rate.

According to still another aspect of the present invention, each of the lenses includes a prism in a form that propagates an optical image being projected onto one edge of the prism to an optical path that a user or wearer of the glasses can see an image formed in the lenses per the optical image. The prism is also integrated with or stacked on an optical correcting lens that is complementary or reciprocal to that of the prism to form an integrated lens for the glasses. The optical correcting lens is provided to correct an optical path from the prism to allow the user to see through the integrated lens without optical distortions.

According to still another aspect of the present invention, one exemplary the prism is a waveguide. Each of the integrated lenses includes an optical waveguide that propagates an optical image being projected onto one end of the waveguide to another end with an optical path that a user can see an image formed per the optical image. The waveguide may also be integrated with or stacked on an optical correcting lens to form an integrated lens for the glasses.

According to still another aspect of the present invention, the integrated lens may be further coated with one for more films with optical characteristics that amplify the optical image before the eyes of the user.

According to still another aspect of the present invention, the glasses may include optionally a few electronic devices (e.g., sensor or microphone) to enable various interactions between the wearer and the displayed content. Signals captured by a device (e.g., a depth sensor) are transmitted to the enclosure via wireless means (e.g., RF or Bluetooth) to eliminate the wired connections between the glasses and the enclosure.

According to still another aspect of the present invention, an optical conduit is used to transport an optical image received from an image source (e.g., a microdisplay). The optical conduit is encapsulated in or integrated with a temple of the display device. Depending on implementation, the optical conduit comprising a bundle or an array of optical fibers may be twisted, thinned or otherwise deformed to fit with a stylish design of the temple while transporting an optical image from one end to another end of the temple.

According to yet another aspect of the present invention, the portable device may be implemented as a standalone device or a docking unit to receive a smartphone. The portable device is primarily a control box that is connected to a network (e.g., the Internet) and generates control and instruction signals when controlled by a user. Many functions provided in the smartphone may be used, such as the network interface and touch screen to receive inputs from the user.

The present invention may be implemented as an apparatus, a method, a part of system. Different implementations may yield different benefits, objects and advantages. In one embodiment, the present invention is a display device comprising: an eyeglasses frame, at least one integrated lens including a light waveguide, wherein the integrated lens is framed in the eyeglasses frame, at least one temple attached to the eyeglasses frame, and a set of optical fibers having a first end and a second end, the first end receiving a sequence of optical images projected thereon from a lens deposed before the second end, wherein the optical images are sequentially transported to the second end by total internal reflection within the optical fibers, wherein no other power-driven electronic components are needed in the display device to receive the optical images and deliver the optical images to the integrated lens. In one embodiment, data image to generate the optical images is at first refresh rate and in first resolution, two of the optical images are successively displayed in the integrated lens, resulting in a combined optical image at second refresh rate and in second resolution, wherein the first refresh rate=2× the second refresh rate, and the first resolution=½× the second resolution (e.g., first refresh rate=120 Hz, first resolution=640× 480).

In still another embodiment, the present invention is a method for a display device, the method comprises: receiving a sequence of optical images from a set of optical fibers having a first end and a second end, where the first end receives the optical images being projected thereon, the second end is coupled to one integrated lens including a light waveguide, wherein the integrated lens is framed in an eyeglasses frame including at least one temple attached to the eyeglasses frame, wherein the optical images are sequentially transported from the first end to the second end by total internal reflection within the optical fibers, and no other power-driven electronic components are needed in the display device to receive the optical images and deliver the optical images to the integrated lens.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 4 shows that an waveguide is used to transport an optical image from one end of the waveguide to another end thereof;

FIG. 6D illustrates what it is means by separating an image across its intensities to produce two frames of equal size to the original image;

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2A-7B. However, those skilled in the art will readily appreciate that the detailed description given herein with respect to these figures is for explanatory purposes as the invention extends beyond these limited embodiments.

Figure 1A:
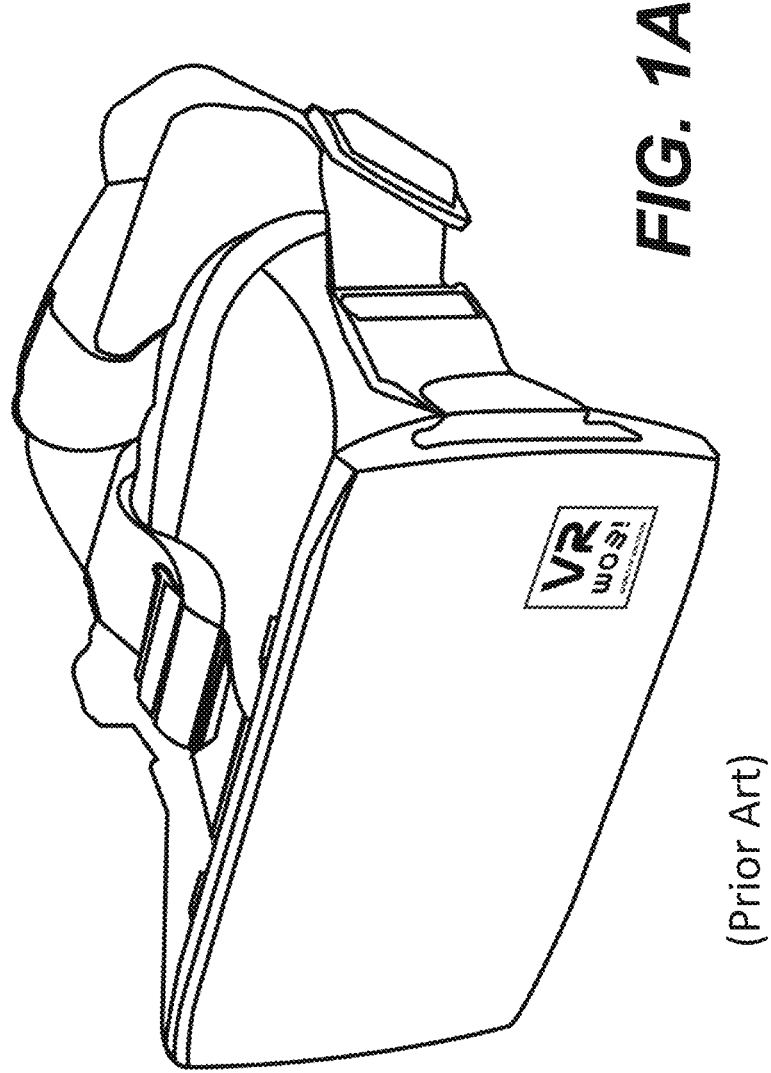
FIG. 1A shows an exemplary goggle now commonly seen in the market for the application of delivering or displaying VR or AR.
Figure 1B:
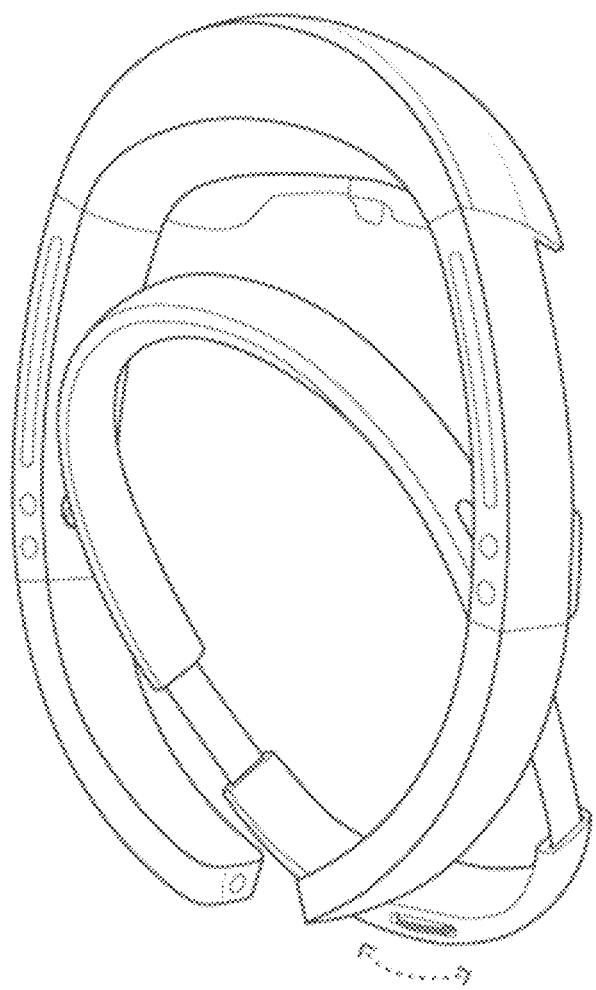
FIG. 1B shows a sketch of HoloLens from Microsoft.
Figure 2A:
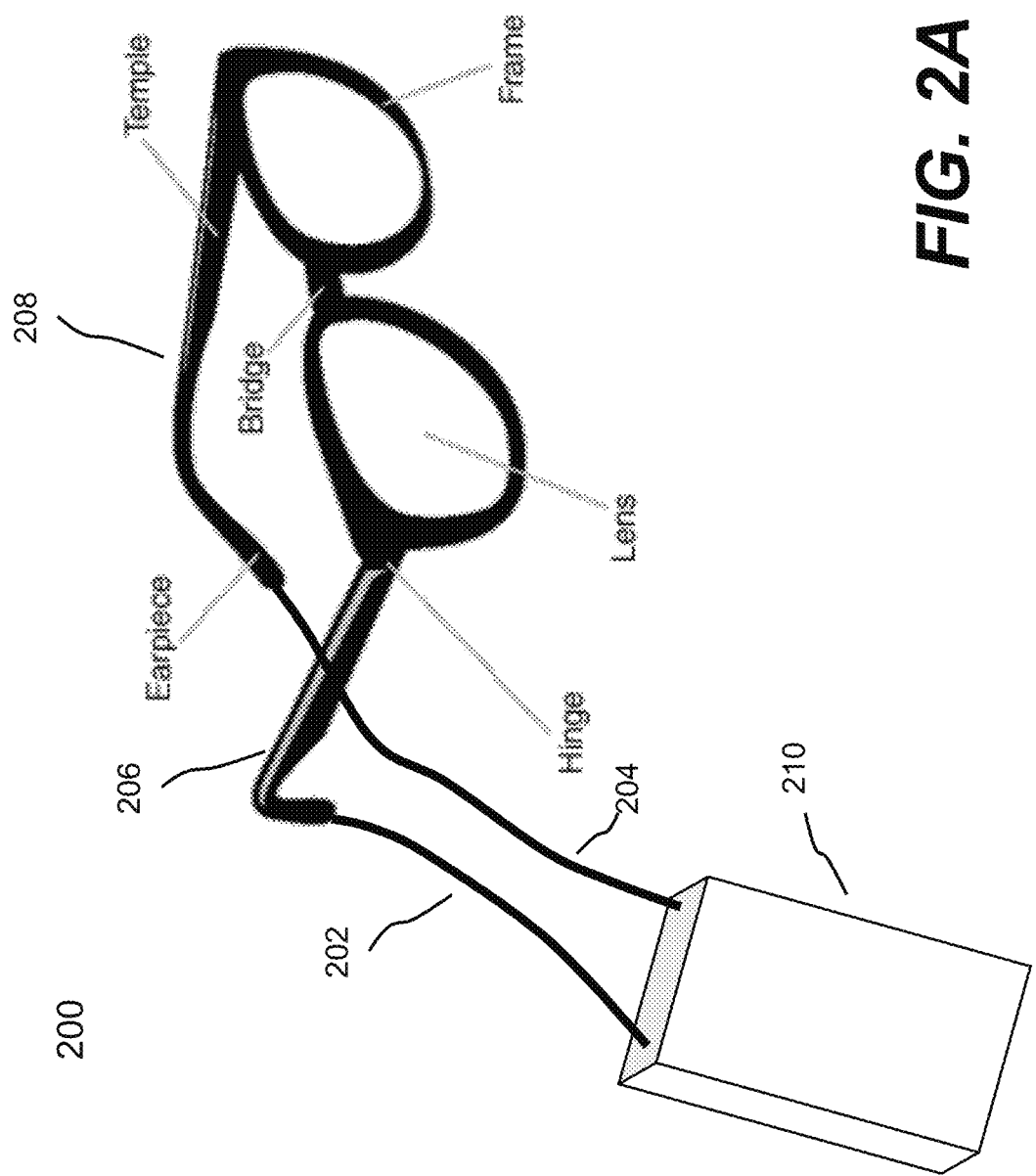
FIG. 2A shows a pair of exemplary glasses that can be used for the application of VR or AR or both according to one embodiment of the present invention.

Referring now to the drawings, in which like numerals refer to like parts throughout the several views. FIG. 2A shows a pair of exemplary glasses 200 that are used for applications of VR/AR according to one embodiment of the present invention. The glasses 200 appear no significant difference to a pair of normal glasses but include two flexible cables 202 and 204 that are respectively extended from the temples 206 and 208. According to one embodiment, each pair of the two flexible cables 202 and the temples 206 and 208 are integrated or removably connected at one end thereof and include one or more optical fibers.

Both of flexible cables 202 are coupled at another end thereof to a portable computing device 210, where the computing device 210 generates images to drive a microdisplay, where the images are displayed on the microdisplay. The displayed images are optically captured and projected onto one end of the cables 202. The optical images are transported through the optical fibers in the flexible cables 202 by the total internal reflections therein all the way to another end of the optical fibers, where the optical images are projected onto the lenses in the glasses 200.

Figure 2B:
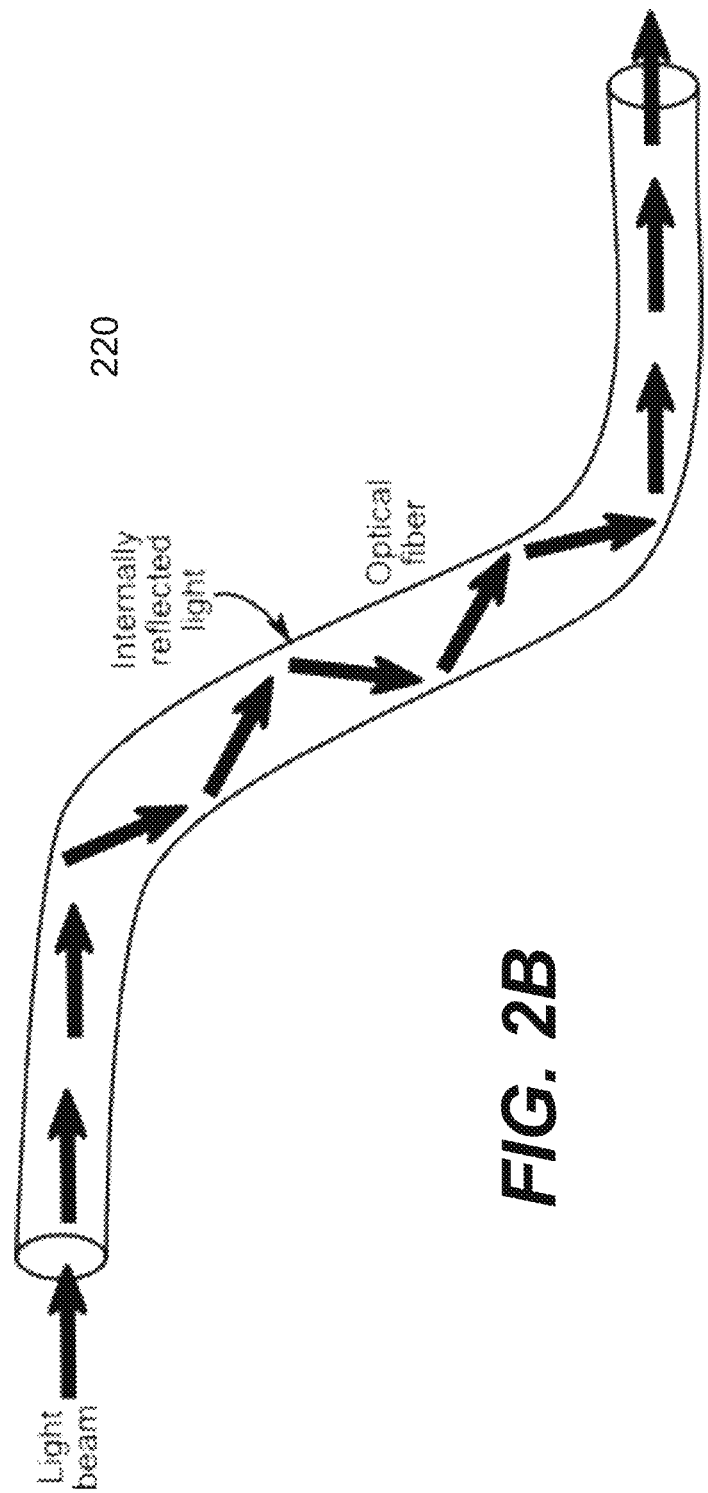
FIG. 2B illustrates that an optical fiber is used to transmit light from one place to the other along curved path in a more effective manner or by total internal reflections within the fiber.

According to one embodiment, each of the two flexible cables 202 includes one or more optical fibers. Optical fibers are used to transmit light from one place to the other along curved path in a more effective manner as shown in FIG. 2B. In one embodiment, the optical fibers are formed with thousands of strands of a very fine quality glass or quartz of refractive index about 1.7 or so. The thickness of a strand is tine. The strands are coated with a layer of some material of lower refractive index. The ends of the strands are polished and clamped firmly after aligning them carefully. When light is incident at a small angle at one end, it gets refracted into the strands (or fibers) and gets incident on the interface of the fibers and the coating. The angle of incidence being greater than the critical angle, the ray of light undergoes total internal reflections and essentially transports the light from one end to another end even if the fiber is bent. Depending on the implementation of the present invention, a single fiber or a plurality of fibers arranged in parallel may be used to transport an optical image projected onto one end of the fiber or fibers to another end thereof. In general, a high-resolution image would require more fibers to transmit through. As will be further described below according to one embodiment, the number of fibers in use is minimized by transmitting images in first (low) resolution, resulting in fewer number of fibers. Two of these images (e.g., two successive images) are combined after the transmission through the fibers by refreshing these two images at a double rate to generate a perceived image second (high) resolution.

Figure 2C:
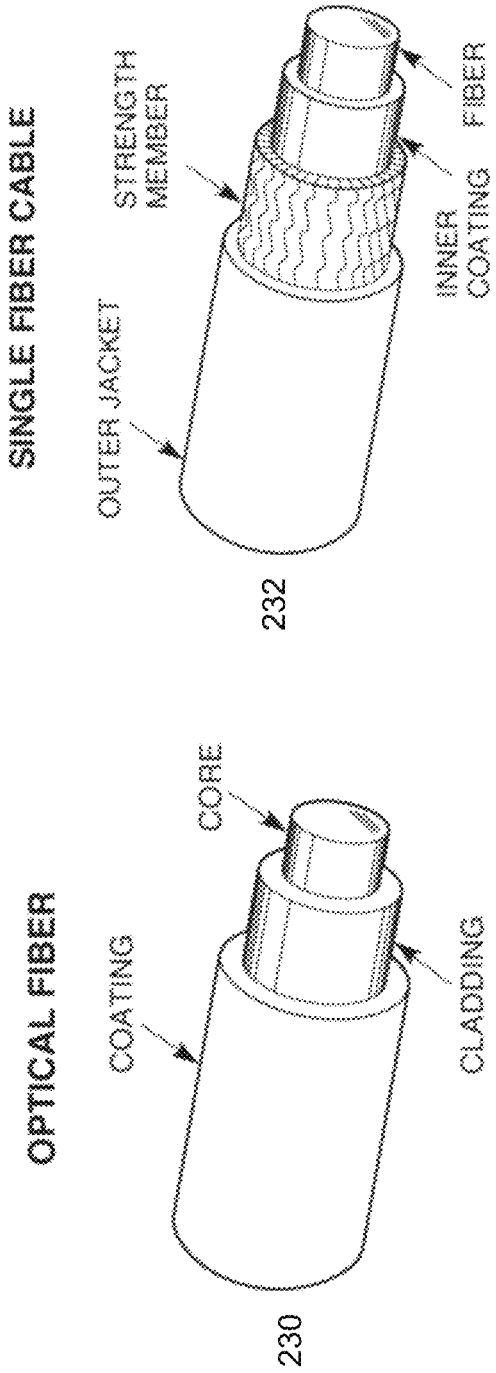
FIG. 2C shows two exemplary ways to encapsulate a fiber or a plurality of fibers according to one embodiment of the present invention.

FIG. 2C shows two exemplary ways to encapsulate a fiber or a plurality of fibers according to one embodiment of the present invention. The encapsulated fiber or fibers may be used as the cable 202 or 204 in FIG. 2A and extended through each of the non-flexible temples 206 and 208 all the way to the end thereof. According to one embodiment, the temples 206 and 208 are made of a type of material (e.g., plastic or metal) commonly seen in a pair of regular glasses, a portion of the cable 202 or 204 is embedded or integrated in the temple 206 or 208, resulting in a non-flexible part while, another portion of the cable 202 or 204 remains flexible. According to another embodiment, the non-flexible part and the flexible part of the cable 202 or 204 may be removably connected via a type of interface or connector.

Figures 2D, 2E:
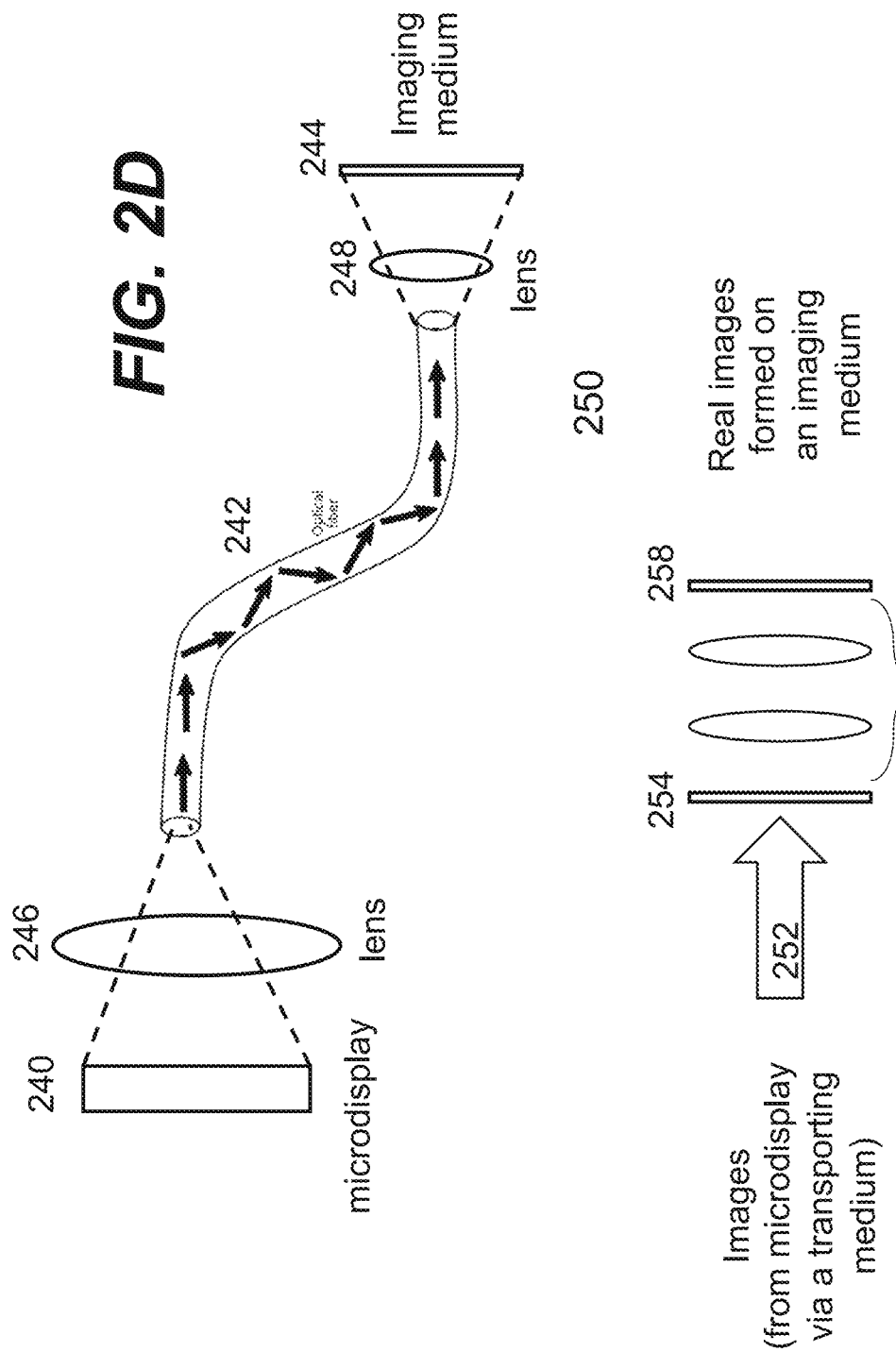
FIG. 2D shows how an image is being transported from a microdisplay via a fiber cable to an imaging medium.
FIG. 2E shows a set of exemplary variable focus elements (VFE) to accommodate an adjustment of the projection of an image onto an optical object (e.g., an imaging medium or a prism)

Referring now to FIG. 2D, it shows how an image is being transported from a microdisplay 240 via a fiber cable 242 to an imaging medium 244. As will be further described below, an imaging medium 244 may be a physical thing (e.g., films) or non-physical thing (e.g., the air). A microdisplay is a display that has a very small screen (e.g., far less than an inch). This type of tiny electronic display system was introduced commercially in the late 1990s. The most common applications of microdisplays include rear-projection TVs and head-mounted displays. Microdisplays may be reflective or transmissive depending upon the way light is allowed to pass through the display unit. Through a lens 246, an image (not shown) displayed on the microdisplay 240 is picked up by one end of the fiber cable 242 that transports the image to the other end of the fiber cable 242. Another lens 248 is provided to collect the image from the fiber cable 242 and projects it to the imaging medium 244. Depending on the implementation, there are different types of microdisplays and imaging mediums. Some of the embodiments of the microdisplays and imaging mediums will be described in detail below.

FIG. 2E shows a set of exemplary variable focus elements (VFE) 250 to accommodate an adjustment of the projection of an image onto an optical object (e.g., an imaging medium or a prism). To facilitate the description of various embodiments of the present invention, it is assumed that there is an image medium. As illustrated in FIG. 2E, an image 252 transported by a fiber cable reaches the end surface 254 of the fiber cable. The image 252 is focused by a set of lens 256, referred to herein as variable focus elements (VFE), onto an imaging medium 258. The VFE 256 is provided to be adjusted to make sure that the image 252 is precisely focused onto the imaging medium 258. Depending the implementation, the adjustment of the VFE 256 may be done manually or automatically in accordance with an input (e.g., a measurement obtained from a sensor). According to one embodiment, the adjustment of the VFE 256 is performed automatically in accordance with a feedback signal derived from a sensing signal from a sensor looking at an eye (pupil) of the wearer wearing the glasses 200 of FIG. 2A.

Figure 2F:
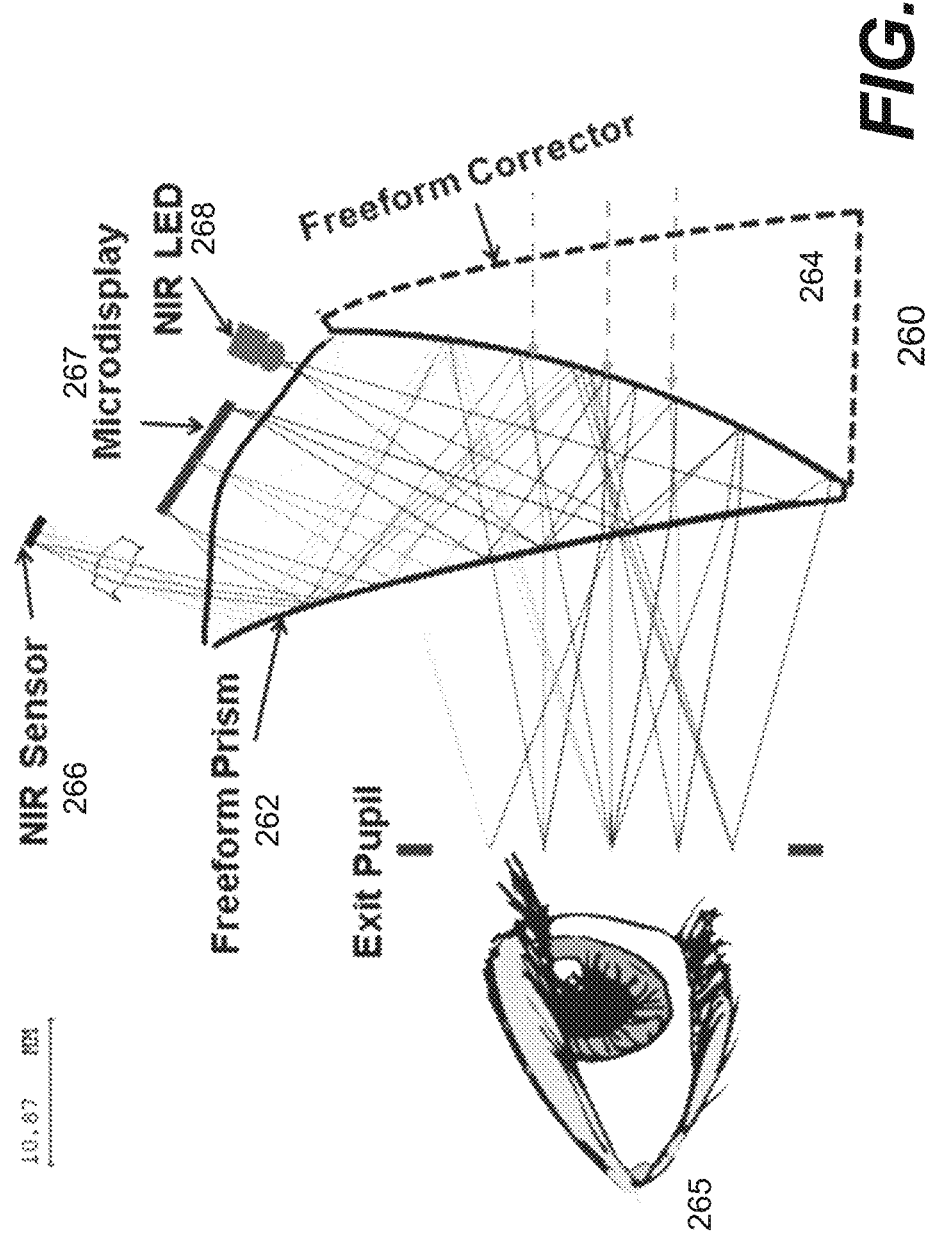
FIG. 2F shows an exemplary lens that may be used in the glasses shown in FIG. 2A, where the lens includes two parts, a prism and an optical correcting lens or corrector.

Referring now to FIG. 2F, it shows an exemplary lens 260 that may be used in the glasses shown in FIG. 2A. The lens 260 includes two parts, a prism 262 and an optical correcting lens or corrector 264. The prism 262 and the corrector 264 are stacked to form the lens 260. As the name suggests, the optical corrector 264 is provided to correct the optical path from the prism 262 so that a light going through the prism 262 goes straight through the corrector 264. In other words, the refracted light from the prism 262 is corrected or de-refracted by the corrector 264. In optics, a prism is a transparent optical element with flat, polished surfaces that refract light. At least two of the flat surfaces must have an angle between them. The exact angles between the surfaces depend on the application. The traditional geometrical shape is that of a triangular prism with a triangular base and rectangular sides, and in colloquial use a prism usually refers to this type. Prisms can be made from any material that is transparent to the wavelengths for which they are designed. Typical materials include glass, plastic and fluorite. According to one embodiment, the type of the prism 262 is not in fact in the shape of geometric prisms, hence the prism 262 is referred herein as a freeform prism, which leads the corrector 264 to a form complementary, reciprocal or conjugate to that of the prism 262 to form the lens 260.

On one edge of the lens 260 or the edge of the prism 262, there are at least three items utilizing the prism 262 that may be optionally or selectively used according to one embodiment of the present invention. Referenced by 267 is an imaging medium corresponding to the imaging medium 244 of FIG. 2D or 258 of FIG. 2E. Depending on the implementation, the image transported by the optical fiber 242 of FIG. 2D may be projected directly onto the edge of the prism 262 or formed on the imaging medium 267 before it is projected onto the edge of the prism 262. In any case, the projected image is refracted in the prism 262 and subsequently seen by the eye 265 in accordance with the shapes of the prism 262. In other words, a user wearing a pair of glasses employing the lens 262 can see the image being displayed through or in the prism 262.

A sensor 266 is provided to image the position or movement of the pupil in the eye 265. Again, based on the refractions provided by the prism 262, the location of the pupil can be seen by the sensor 266. In operation, an image of the eye 265 is captured. The image is analyzed to derive how the pupil is looking at the image being shown through or in the lens 260. In the application of AR, the location of the pupil may be used to activate an action. Optionally, a light source 268 is provided to illuminate the eye 265 to facilitate the image capture by the sensor 266. According to one embodiment, the light source 268 uses a near inferred source as such the user or his eye 265 would not be affected by the light source 268 when it is on.

Figure 2G:
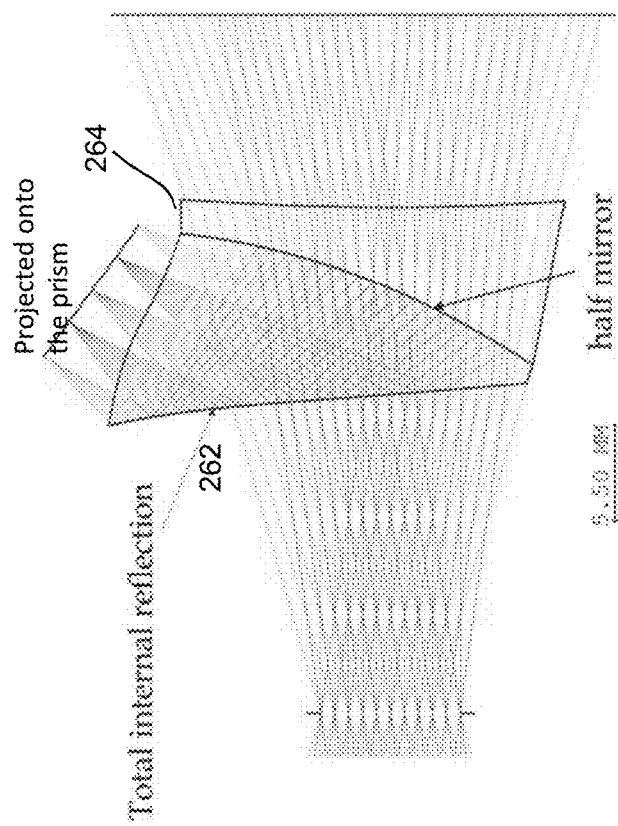
FIG. 2G shows the internal reflections from a plurality of sources (e.g., a sensor, an imaging medium and a plurality of light sources) in an irregular prism.
Figure 2H:
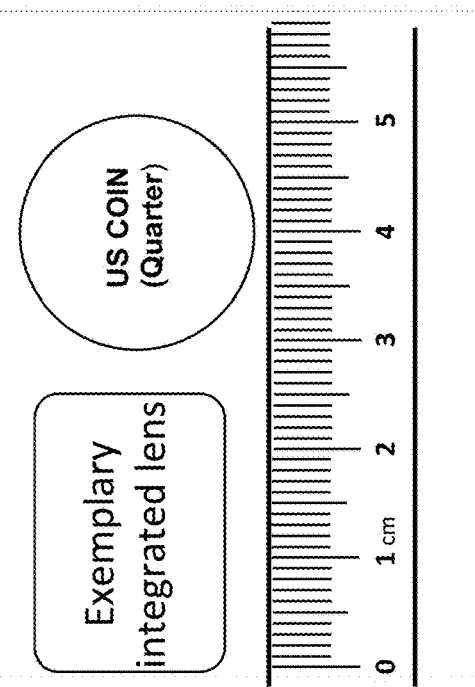
FIG. 2H shows a comparison of such an integrated lens to a coin and a ruler.

FIG. 2G shows the internal reflections from a plurality of sources (e.g., the sensor 266, the imaging medium 267 and the light source 268). As the prism is uniquely designed in particular shapes or to have particular edges, the rays from the sources are reflected several times within the prism 268 and subsequently impinge upon the eye 265. For completeness, FIG. 2H shows a comparison of such a lens to a coin and a ruler in sizes.

As described above, there are different types of microdisplays, hence different imaging mediums. The table below summarizes some of the microdisplays that may be used to facilitate the generation of an optical image that can be transported by one or more optical fibers one end to another end thereof by total internal reflection within the optical fiber(s).

| No. | Microdisplay types | Features | Notes |
|---|---|---|---|
| 1 | LCoS (LCD and OLED) | Full color image displayed on a silicon | A single image |
| 2 | LCoS + LED (RGB sequentially) LCoS + laser (visible, RGB sequentially) LCoS + laser (non-visible) | A single color image displayed at a time | Three images |
| 3 | SLM + laser (RGB sequentially) | A single optical color image | Three optical images |
| 4 | SLM + laser (non-visible) | A single non-visible color image | Need conversion |

LCoS = Liquid crystal on silicon;
LCD = Liquid crystal display;
OLED = Organic light-emitting diode;
RGB = Red, Green and Blue; and
SLM = Spatial light modulation.

In the first case shown above in the table, a full color image is actually displayed on a silicon. As shown in FIG. 2D, the full color image can be picked up by a focal lens or a set of lenses that project the full image right onto one end of the fiber. The image is transported within the fiber and picked up again by another focal lens at the other end of the fiber. As the transported image is visible and full color, the imaging medium 244 of FIG. 2D may not be physically needed. The color image can be directly projected onto one edge of the prism 262 of FIG. 2F.

In the second case shown above in the table, an LCoS is used with different light sources. In particular, there are at least three colored light sources (e.g., red, green and blue) used sequentially. In other words, a single color image is generated per one light source. The image picked up by the fiber is only a single color image. A full color image can be reproduced when all three different single color images are combined. The imaging medium 244 of FIG. 2D is provided to reproduce the full color image from the three different single color images transported respectively by the optical fiber.

Figure 2I:
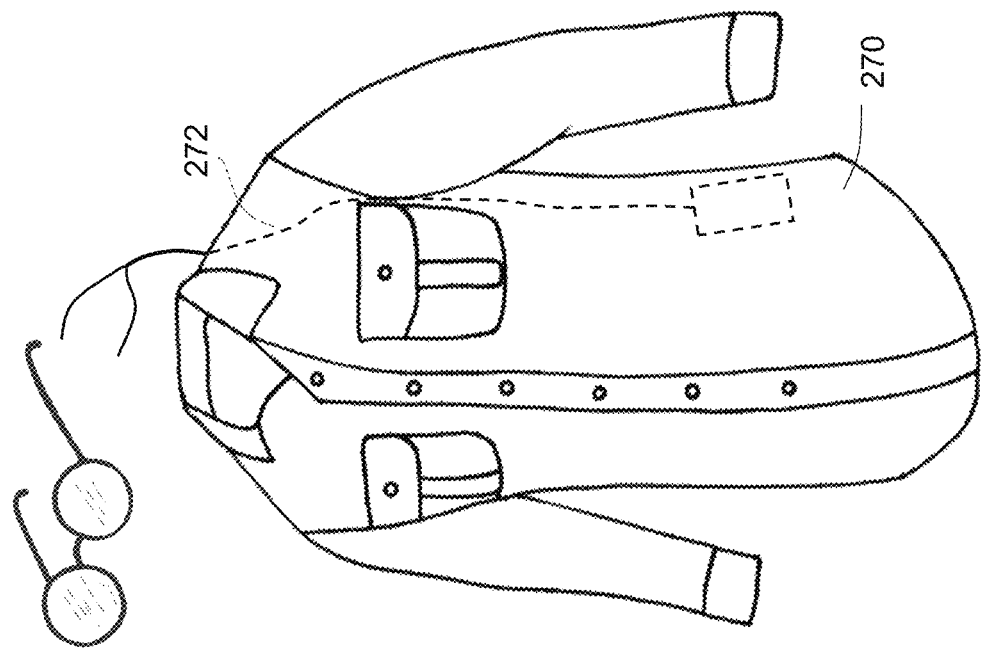
FIG. 2I shows a shirt in which a cable is enclosed within the shirt or attached thereto.

FIG. 2I shows a shirt 270 in which a cable 272 is enclosed within the shirt 270 or attached thereto. The shirt 270 is an example of fabric material or multi-layers. Such a relatively thin cable can be embedded into the multi-layers. When a user wears such a shirt made or designed in accordance with one of the embodiment, the cable itself has less weight while the user can have more freedom to move around.

Figure 3A:
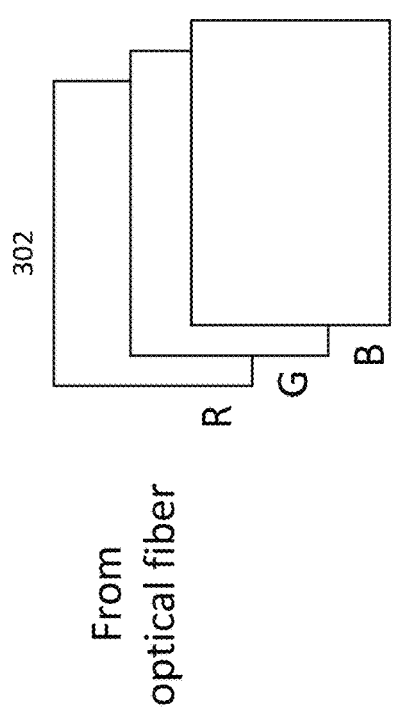
FIG. 3A shows how three single color images are being combined visually and perceived as a full color image by human vision.

FIG. 3A shows how three single color images 302 are being combined visually and perceived as a full color image 304 by human vision. According to one embodiment, three colored light sources are used, for example, red, green and blue light sources that are turned sequentially. More specifically, when a red light source is turned on, only a red image is produced as a result (e.g., from a microdisplay). The red image is then picked up optically and transported by the fiber, and subsequently projected into the prism 262 of FIG. 2F. As the green and blue lights are turned on afterwards and sequentially, the green and blue images are produced and transported respectively by the fiber, and subsequently projected into the prism 262 of FIG. 2F. It is well known that human vision possesses the ability of combining the three single color images and perceives them as a full color image. With the three single color images projected sequentially into the prism, all perfectly registered, the eye sees a full color image.

Figure 3B:
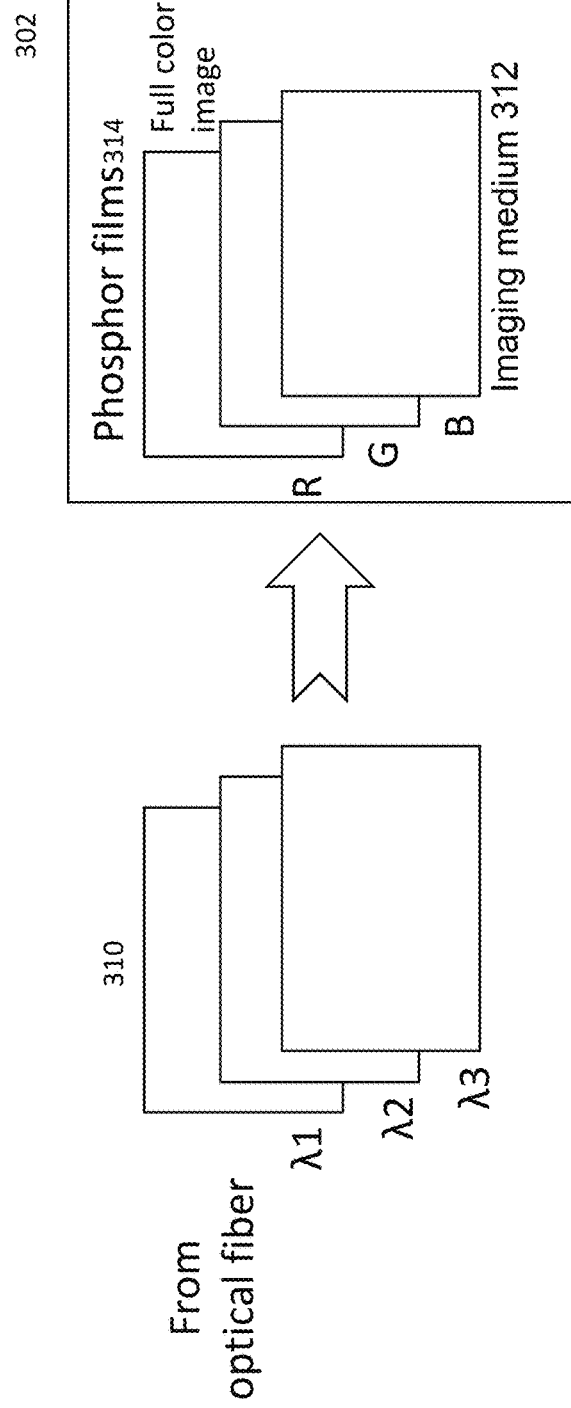
FIG. 3B shows that three different color images are generated under three lights respectively at wavelengths $\lambda 1$, $\lambda 2$, and $\lambda 3$, the imaging medium includes three films, each coated with a type of phosphor.

Also in the second case shown above, the light sources can be nearly invisible. According to one embodiment, the three light sources produce lights near UV band. Under such lighting, three different color images can still be produced and transported but are not very visible. Before they can be presented to the eyes or projected into the prism, they shall be converted to three primary color images that can subsequently be perceived as a full color image. According to one embodiment, the imaging medium 244 of FIG. 2D is provided. FIG. 3B shows that three different color images 310 are generated under three light sources respectively at wavelengths λ1, λ2, and λ3, the imaging medium 312 includes three films 314, each coated with a type of phosphor, a substance that exhibits the phenomenon of luminescence. In one embodiment, three types of phosphor at wavelength 405 nm, 435 nm and 465 nm are used to convert the three different color images produced under the three light sources near UV band. In other words, when one such color image is projected onto a film coated with the phosphor at a wavelength 405 nm, the single color image is converted as a red image that is then focused and projected into the prism. The same process is true with other two single color images that go through a film coated with phosphor at wavelength 435 nm or 465 nm, resulting in green and blue images. When such red, green and blue images are projected sequentially into the prism, a human vision perceives them together as a full color image.

In the third or fourth case shown above in the table, instead of using a light either in the visible spectrum or near invisible to human eyes, the light source uses a laser source. There are also visible lasers and non-visible lasers. Operating not much differently from the first and second cases, the third or fourth case uses what is called spatial light modulation (SLM) to form a full color image. A spatial light modulator is a general term describing devices that are used to modulate amplitude, phase, or polarization of light waves in space and time. In other words, SLM+ laser (RGB sequentially) can produce three separate color images. When they are combined with or without the imaging medium, a full color image can be reproduced. In the case of SLM+ laser (non-visible), the imaging medium shall be presented to convert the non-visible images to a full color image, in which case, appropriate films may be used as shown in FIG. 3B.

Referring now to FIG. 4, it shows that an waveguide 400 is used to transport an optical image 402 from one end 404 of the waveguide 400 to another end 406, wherein the waveguide 400 may be stacked with one or more pieces of glass or lenses (not shown) or coated with one or more films to from a suitable lens for a pair of glasses for the applications of displaying images from a computing device. It is known to those skilled in that art that an optical waveguide is a spatially inhomogeneous structure for guiding light, i.e. for restricting the spatial region in which light can propagate, where a waveguide contains a region of increased refractive index, compared with the surrounding medium (often called cladding).

The waveguide 400 is transparent and shaped appropriately at the end of 404 to allow the image 402 to be propagated along the waveguide 400 to the end 406, where a user 408 can see through the waveguide 400 so as to see the propagated image 410. According to one embodiment, one or more films are disposed upon the waveguide 400 to amplify the propagated image 410 so that the eye 408 can see a significantly amplified image 412. One example of such films is what is called metalenses, essentially an array of thin titanium dioxide nanofins on a glass substrate.

Figure 5A:
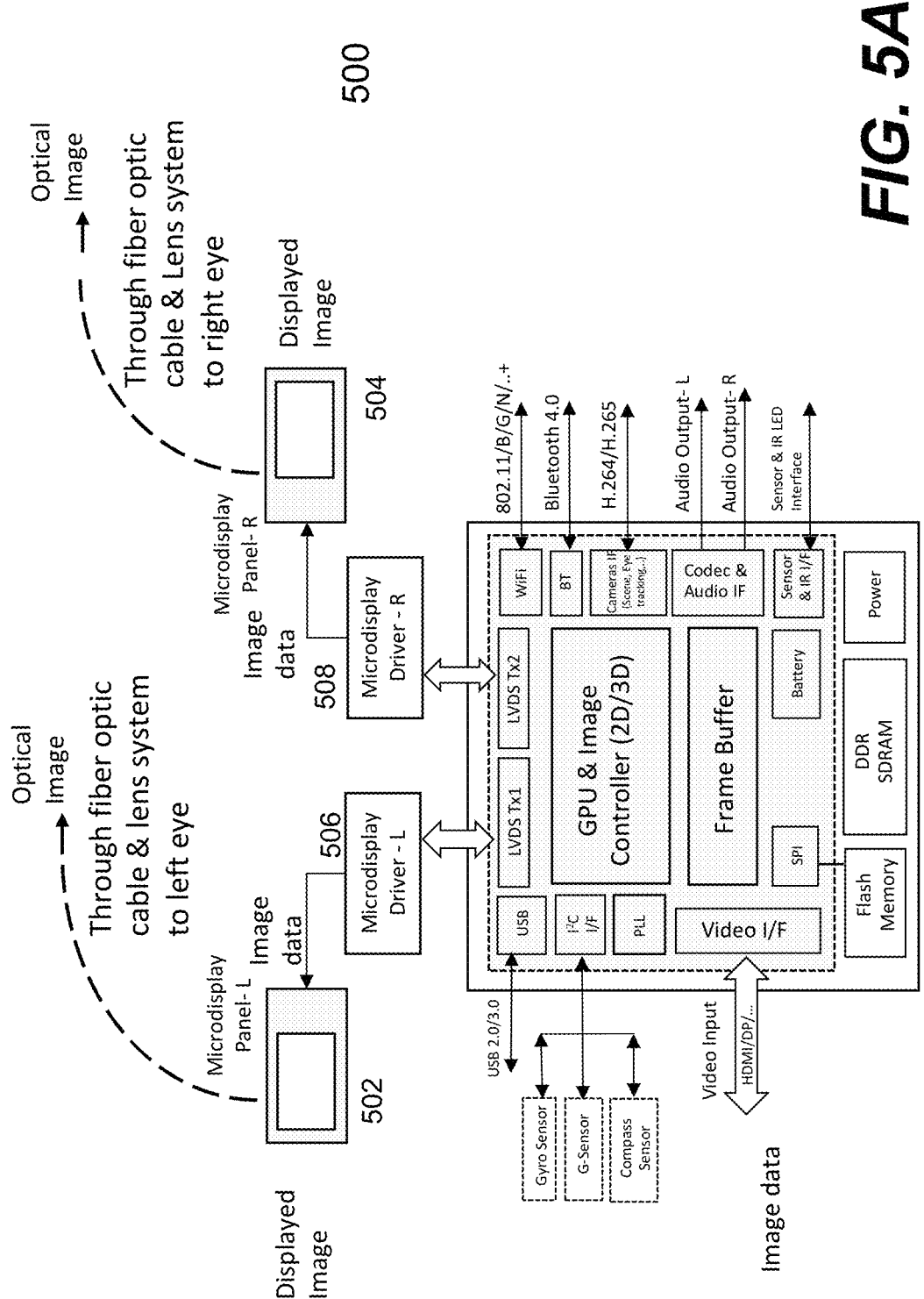
FIG. 5A shows an exemplary functional block diagram that may be used in a separate case or enclosure to produce content related to virtual reality and augmented reality for display on the exemplary glasses of FIG. 2A.

Referring now to FIG. 5A, it shows an exemplary functional block diagram 500 that may be used in a separate case or enclosure to produce content related to virtual reality and augmented reality for display on the exemplary glasses of FIG. 2A. As shown in FIG. 5A, there are two microdisplays 502 and 504 provided to supply content to both of lenses in the glasses of FIG. 2A, essentially a left image goes to the left lens and a right image goes to the right lens. An example of the content is 2D or 3D images and video, or hologram. Each of the microdisplays 502 and 504 is driven by a corresponding driver 506 or 508.

The entire circuit 500 is controlled and driven by a controller 510 that is programmed to generate the content. According to one embodiment, the circuit 500 is designed to communicate with the Internet (not shown), receive the content from other devices. In particular, the circuit 500 includes an interface to receive a sensing signal from a remote sensor (e.g., the sensor 266 of FIG. 2F) via a wireless means (e.g., RF or Bluetooth). The controller 510 is programmed to analyze the sensing signal and provides a feedback signal to control certain operations of the glasses, such as a projection mechanism that includes a focal mechanism auto-focusing and projecting the optical image onto an edge of the prism 262 of FIG. 2F. In addition, the audio is provided to synchronize with the content, and may be transmitted to earphones wirelessly.

FIG. 5A shows an exemplary circuit 500 to produce the content for display in a pair of glasses contemplated in one embodiment of the present invention. The circuit 500 shows that there are two microdisplays 502 and 504 used to provide two respective images or video streams to the two lenses of the glasses in FIG. 2A. According to one embodiment, only one microdisplay may be used to drive the two lenses of the glasses in FIG. 2A. Such a circuit is not provided herein as those skilled in the art know how the circuit can be designed or how to modify the circuit 500 of FIG. 5A.

Figure 5B:
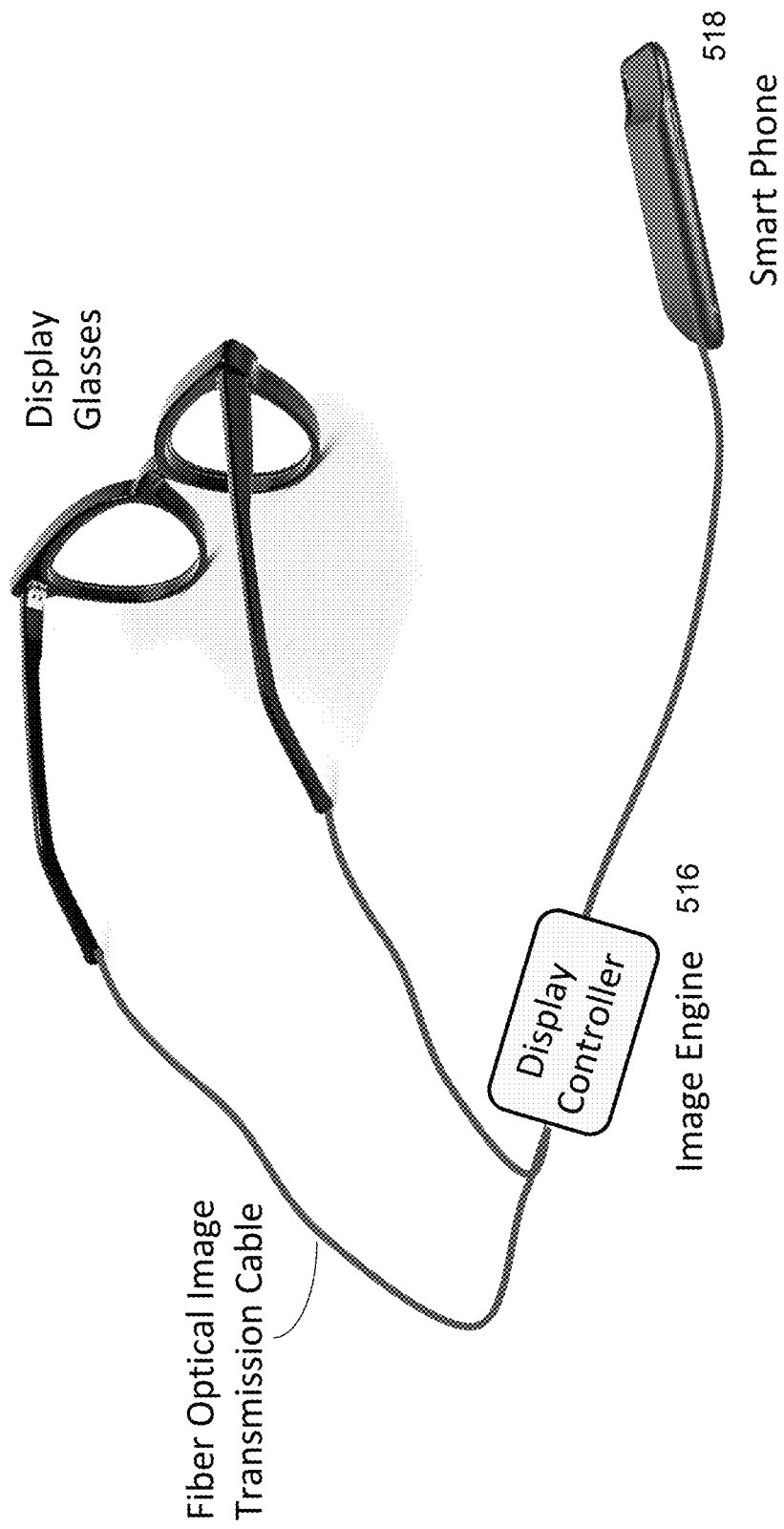
FIG. 5B shows an implementation in which an exemplary circuit is housed in a separate device (a.k.a., an image engine herein) according to an implementation.
Figure 5C:
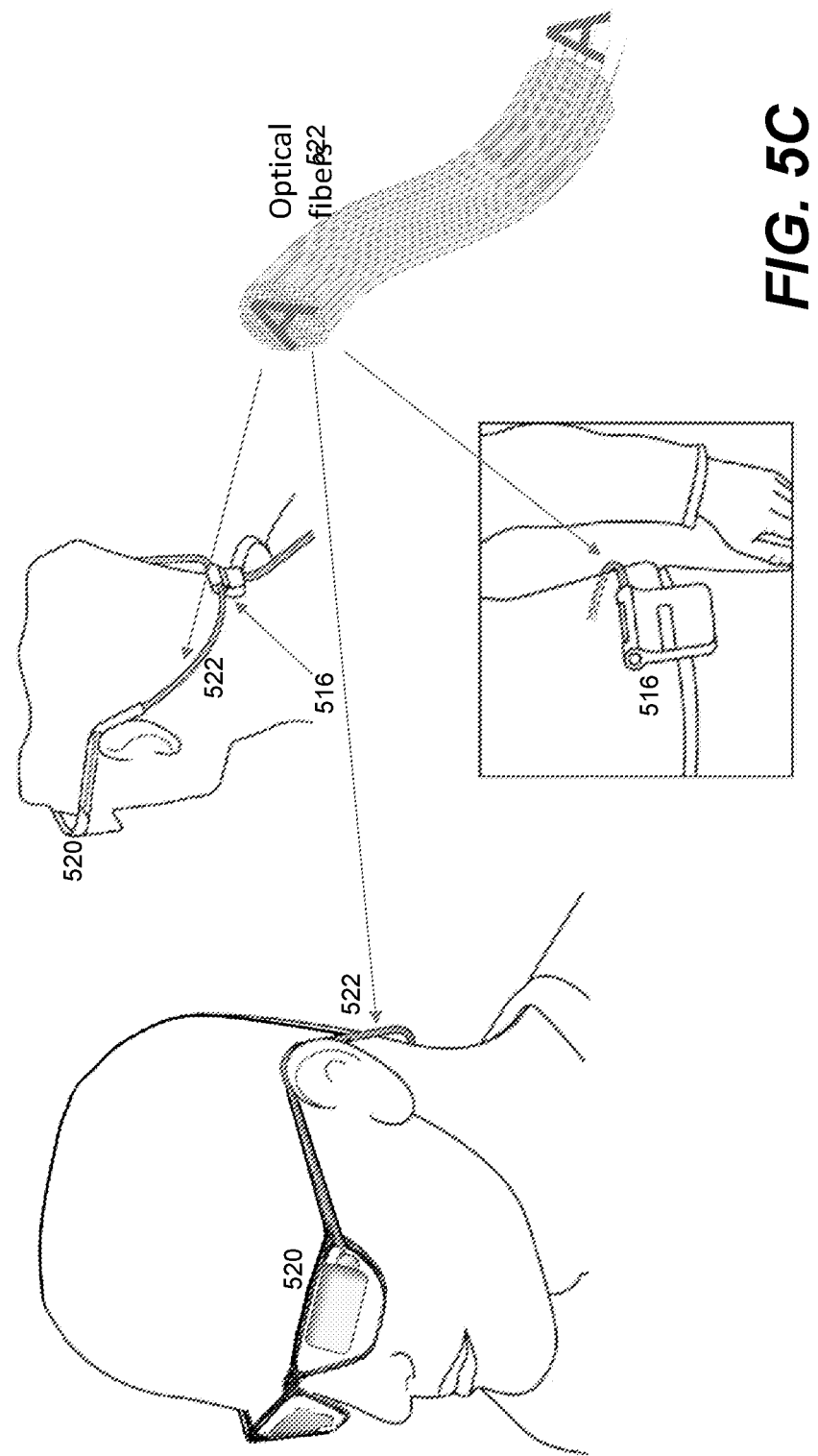
FIG. 5C shows an exemplary embodiment to show how a user wears a pair of display glasses designed according to one embodiment of the present invention.

FIG. 5B shows an implementation in which the exemplary circuit 500 is housed in a separate device 516 (a.k.a., an image engine herein) according to an implementation. The image engine 516 receives source images or video from a smart phone 518 that also acts as a controller and provides necessary interfaces for the wearer or user to control what to receive and show on the display glasses, and how to interact with the display. FIG. 5C shows an exemplary embodiment to show how a user wears such display glasses. According to one embodiment, the display glasses 520 include no active electronic components (power driven) but a pair of optical fibers 522 in terms of delivering images or videos. The accompanying sound can be provided directly to earphones (e.g., earbuds or airbuds) by the smart phone 518. As will be further described below, the thickness or the number of the optical fibers 522 is further reduced by transmitting or transporting low-resolution images/video from the image engine 516 to the glasses 520.

Figure 5D:
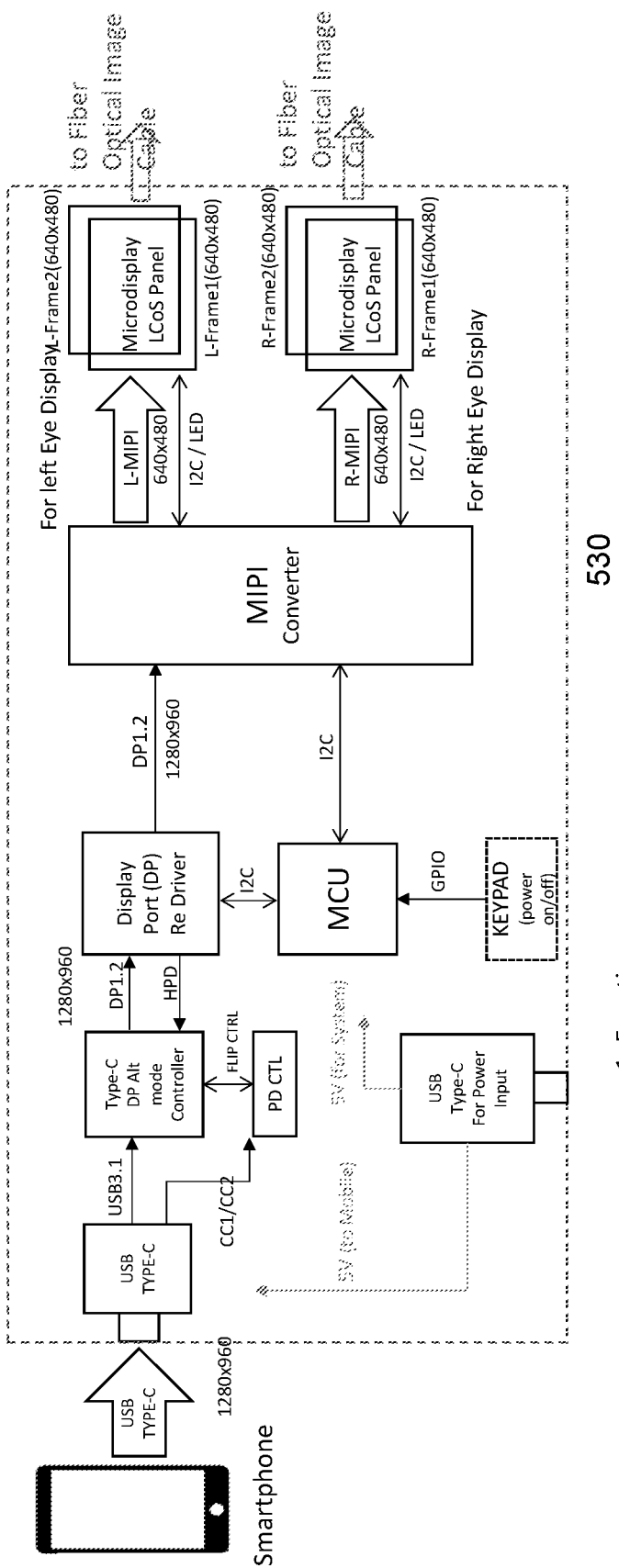
FIG. 5D shows an exemplary circuit block diagram used in an image engine of FIG. 5B, according to one embodiment, that employs the techniques disclosed in U.S. Pat. No.: 10,147,350.

FIG. 5D shows an exemplary circuit block diagram 530, according to one embodiment, that employs the techniques disclosed in U.S. Pat. No.: 10,147,350, content of which is hereby incorporated by reference. As shown in FIG. 5D, the circuit 530 essentially generates two low-resolution images (e.g., 640×480), where these two images are diagonally shifted by one half (½) pixel and have a refresh rate of 120 Hz (versus a commonly used "standard" refresh rate 60 Hz in US). The commonly used "standard" refresh rate for most TVs, PC monitors, and smartphone displays is 60 Hz. A refresh rate of 60 Hz means that the display refreshes 60 times each second. In other words, the image on the display is updated (or refreshed) once every 16.67 milliseconds (ms). When two such images are refreshed twice the standard refresh rate, the perceived image resolution is doubled, namely to 1280×960 perceived by the user on the integrated glasses.

According to one embodiment, an image for display on the display glasses is in native (first) resolution, for example 640×480 or a predefined resolution for efficient transmission through the optical fibers, and has a first refresh rate when in video. In case the image is in a resolution higher than the first resolution, it may be reduced to a lower resolution. A duplicated but one half (½) pixel diagonally shifted image is generated per U.S. Pat. No.: 10,147,350, resulting in a second image in the first resolution, both such images are successively projected onto the optical fibers 522 at twice the refresh rate of the original image, namely second refresh rate=2× first refresh rate. When the images exit successively from the other end of the optical fibers, they are perceived in a waveguide as an image in second resolution, twice as much as the first resolution.

Figure 6A:
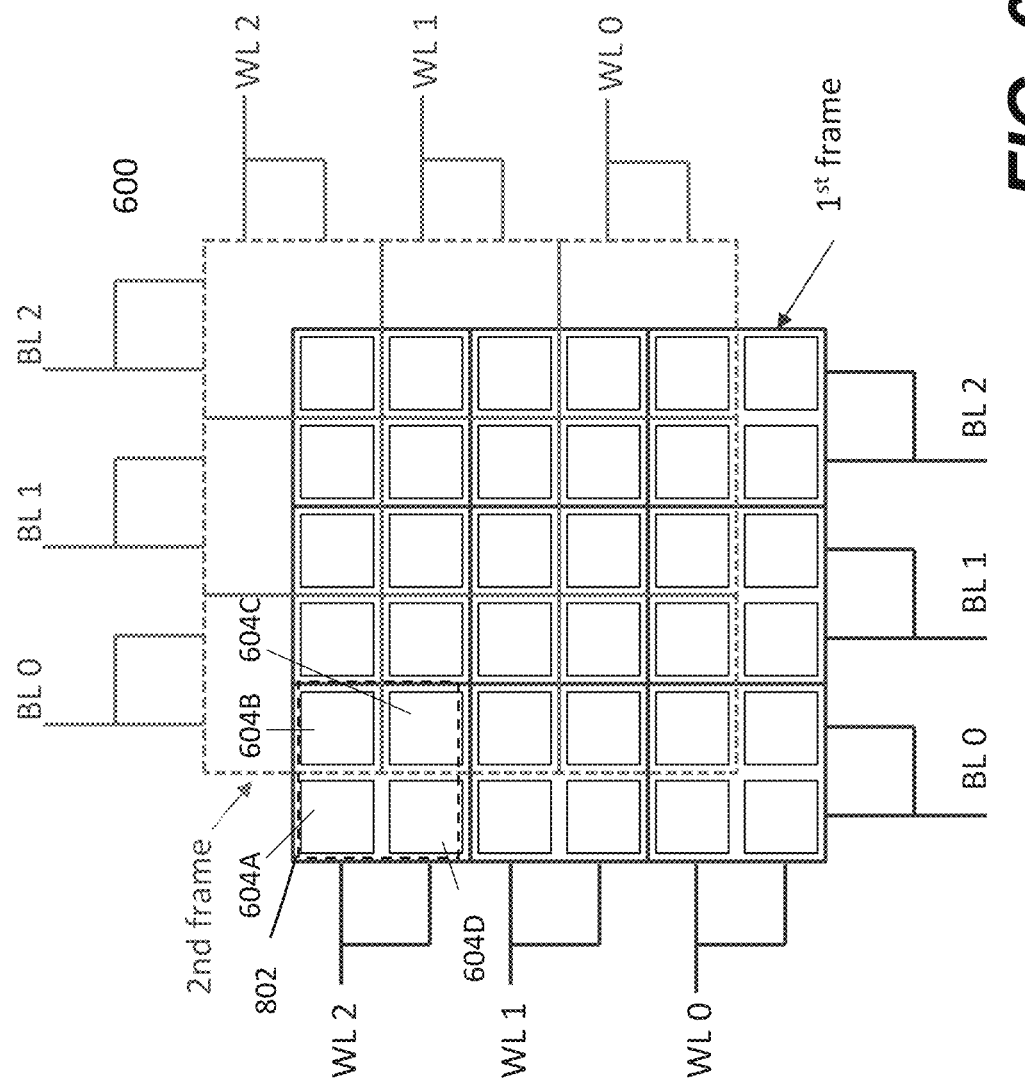
FIG. 6A shows an array of pixel elements, as an example, each of the pixel elements is shown to have four sub-image elements.

FIG. 6A-FIG. 6E duplicate FIG. 16A-FIG. 16E of U.S. Pat. No.: 10,147,350. As described above, optical images exiting from the optical fibers in one embodiment of the present invention is to double the perceived spatial resolution of an input image. Referring to FIG. 6A, it shows an array of pixel elements 600, as an example, each 602 of the pixel elements 600 (forming an image or a data image) is shown to have four sub-image elements 604A, 604B, 604C and 604D. When an input image of a first resolution (e.g., 500×500) is received and displayed in the first resolution, each of the pixel values is stored in each of the pixel elements 600. In other words, the sub-image elements 604A, 604B, 604C and 604D are all written or stored with the same value and are addressed at the same time. As shown in FIG. 6A, the word line (e.g., WL 0, WL 1 or WL 2) addresses two rows of sub-pixels belonging to the pixel 602 at the same time while the bit line (e.g., BL 0, BL 1 or BL 2) addresses two columns of sub-pixels belonging to the pixel 602 at the same time. At any moment, a pixel value is written to a pixel 602, the sub-image elements 604A, 604B, 604C and 604D therein are all selected. In the end, the input image is displayed in the first resolution (e.g., 500×500), namely the same resolution as that of the input image.

Figures 6B, 6C:
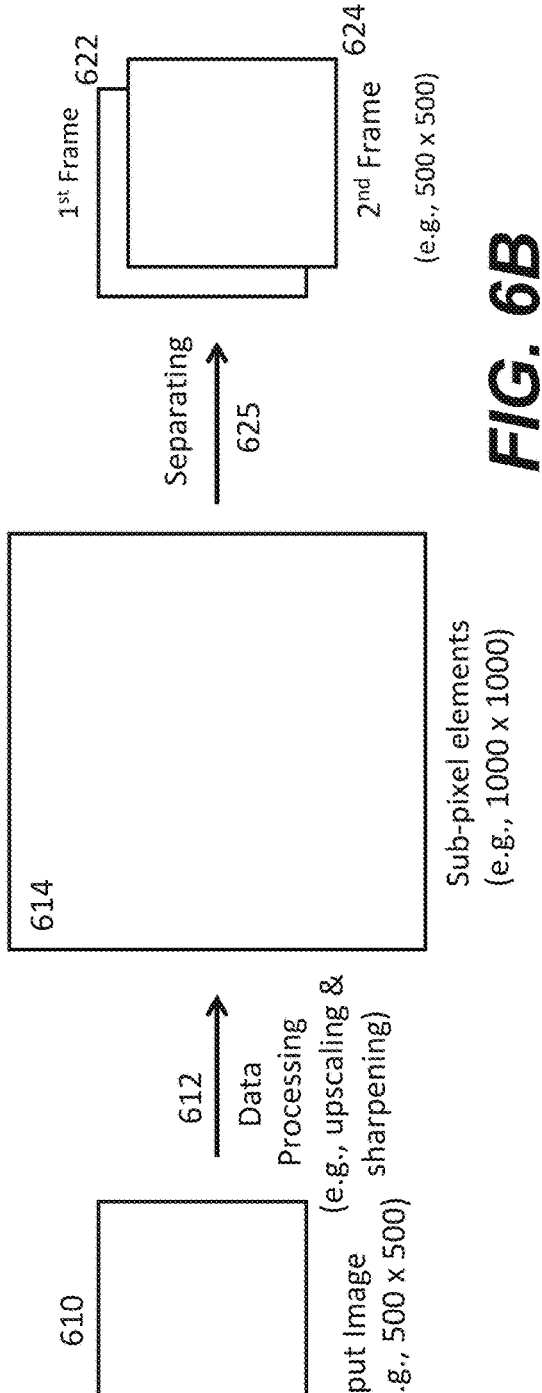
FIG. 6B shows a concept of producing an expanded image from which two frames are generated.
FIG. 6C shows an example of an image expanded to an image of double size in the sub-pixel elements by writing a pixel value into a group of all (four) sub-pixel elements, where the expanded is processed and separated into two frames via two approaches.

It is now assumed that an input (data) image of a first resolution (e.g., 500×500) is received and displayed in a second resolution (e.g., 1000×1000), where the second resolution is twice as much as that the first resolution. According to one embodiment, the sub-pixel elements are used to achieve the perceived resolution. It is important to note that such improved spatial resolution is perceived by human eyes, not actually the doubled resolution of the input image. To facilitate the description of the present invention, FIG. 6B and FIG. 6C are used to show how an input image is expanded to achieve the perceived resolution.

It is assumed that an input image 610 is of 500×500 in resolution. Through a data process 612 (e.g., upscaling and sharpening), the input image 610 is expanded to reach an image 614 in dimension of 1000×1000. FIG. 6C shows an example of an image 616 expanded to an image 618 of double size in the sub-pixel elements. In operation, each of the pixels in the image 616 is written into a group of all (four) sub-pixel elements (e.g., the exemplary sub-pixel structure of 2×2). Those skilled in the art understand that the description herein is readily applicable to other sub-pixel structures (3×3, 4×4 or 5×5, and etc.), resulting in even more perceived resolution. According to one embodiment, a sharpening process (e.g., part of the data processing 612 of FIG. 16B) is applied to the expanded image 618 to essentially process the expanded image 618 (e.g., filtering, thinning or sharpening the edges in the images) for the purpose of generating two frames of images from the expanded image 618. In one embodiment, the value of each sub-pixel is algorithmically recalculated to better define the edges and produce the image 620, In another embodiment, values of neighboring pixels are referenced to sharpen an edge.

The processed image 620 is then separated into two images 622 and 624 by the separation process 625. Both 622 and 624 have a resolution same as that of the input image (e.g., 500×500), where the sub-pixel elements of images 622 and 624 are all written or stored with the same value. The boundary of pixel elements in the image 622 is purposely to be different from the boundary of pixel elements in the image 624. In one embodiment, the boundaries of pixel elements are offset by half-pixel (one sub-pixel in a 2×2 sub-pixel array) vertically and by half-pixel (one sub-pixel in a 2×2 sub-pixel array) horizontally. The separation process 625 is done in a way that, when overlapping images 622 and 624, the combined image can best match the image 620 of quadruple resolution of the input image 616. For the example in FIG. 6C, to keep the constant intensity of the input image 610, the separation process 625 also includes a process of reducing the intensity of each of the two images 622 and 624 by 50%. Operationally, the intensities in the first image are reduced by N percent, where N is an integer and ranged from 1 to 100, but practically is defined around 50. As a result, the intensities in the second image are reduced by (100-N) percent. These two images 622 and 624 are displayed alternatively at twice the refresh rate as that for the original input image 610. In other words, if the input image is displayed at 50 Hz per second, each of pixels in two images 622 and 624 are displayed 100 Hz per second. Due to the offset in pixel boundary and data process, viewers perceive the combined image close to the image 620. Offsetting the pixel boundary between images 622 and 624 has the effect of "shifting" pixel boundary. As illustrated as two images 626 and 628 according to another embodiment, the example in FIG. 6C is like shifting a (sub)pixel in southeast direction.

Depending on implementation, the separation process 625 may be performed based on an image algorithm or one-pixel shifting, wherein one-pixel shifting really means one subpixel in the sub-pixel structure as shown in FIG. 6A. There are many ways to separate an image of N×M across the intensity into two images, each of N×M, so that the perceived effect of displaying the two images alternatively at the twice refresh rate reaches the visual optimum. For example, one exemplary approach is to retain/modify the original image as a first frame with reduced intensity while producing the second frame with the remaining from the first frame, again with reduced intensity. Another exemplary approach is to shift one half (½) pixel (e.g., horizontally, vertically or diagonally) from the first frame (obtained from the original or an improved thereof) to produce the second frame, more details will be provided in the sequel. FIG. 6C shows that two images 622 and 624 are produced from the processed expanded image 620 per an image algorithm while that two images 626 and 628 are generated by shifting the first frame on pixel diagonally to produce the second frame. It should be noted that the separation process herein means to separate an image across its intensities to produce two frames of equal size to the original image. FIG. 6D illustrates an image of two pixels, one being full intensity (shown as black) and the other one being one half of the full intensity (shown as grey). When the two pixel image is separated into two frames of equal size to the original, the first frame has two pixels, both being one half of the full intensity (shown as grey) and the second frame also has two pixels, one being one half of the full intensity (shown as grey) and the other being almost zero percent of the full intensity (shown as white). Now there are twice as many pixels as the original input image, displayed in a checkerboard pattern. Since each pixel is refreshed only 60 times per second, not 120, the pixels are half as bright, but because there are twice as many of them, the overall brightness of the image stays the same.

Figure 6E:
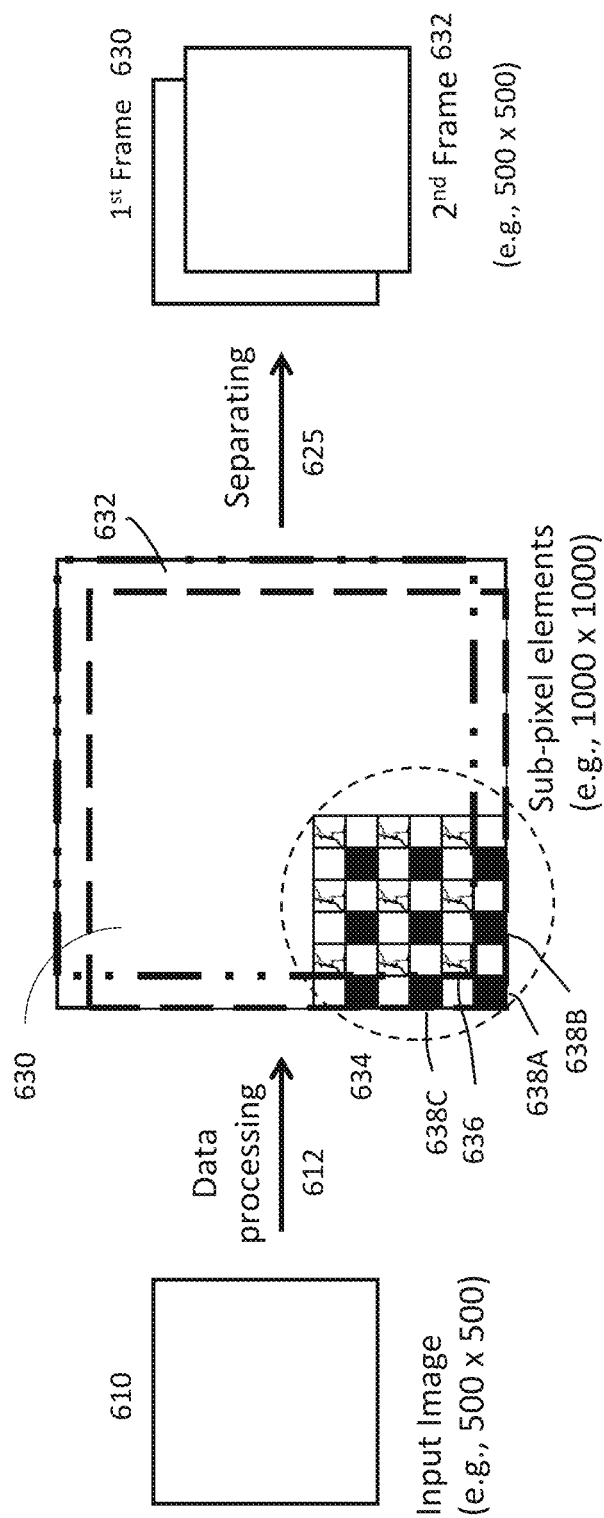
FIG. 6E shows another embodiment to expand an input image to an expanded image with two decimated and interlaced images.

Referring now to FIG. 6E, it shows another embodiment to expand an input image 610. It is still assumed that the input image 610 is of 500×500 in resolution. Through the data process 612, the input image 610 is expanded to reach a dimension of 1000×1000. It should be noted that 1000×1000 is not the resolution of the expanded image in this embodiment. The expanded image has two 500×500 decimated images 630 and 632. The expanded view 634 of the decimated images 630 and 632 shows that pixels in one image is decimated to allow the pixels of another image to be generated therebetween. According to one embodiment of the present invention, the first image is from the input image while the second image is derived from the first image. As shown in the expanded view 634 of FIG. 6E, an exemplary pixel 636 of the second image 632 is derived from three pixels 638A, 638B and 638C. The exemplary pixel 632 is generated to fill the gap among three pixels 638A, 638B and 638C. The same approach, namely shifting by one half (½) pixel, can be applied to generate all the pixels for the second image along a designated direction. At the end of the data processing 612, there is an interlaced image including two images 630 and 632, each is of 500×500. A separation process 625 is applied to the interlaced image to produce or restore therefrom two images 630 and 632.

Figure 7A:
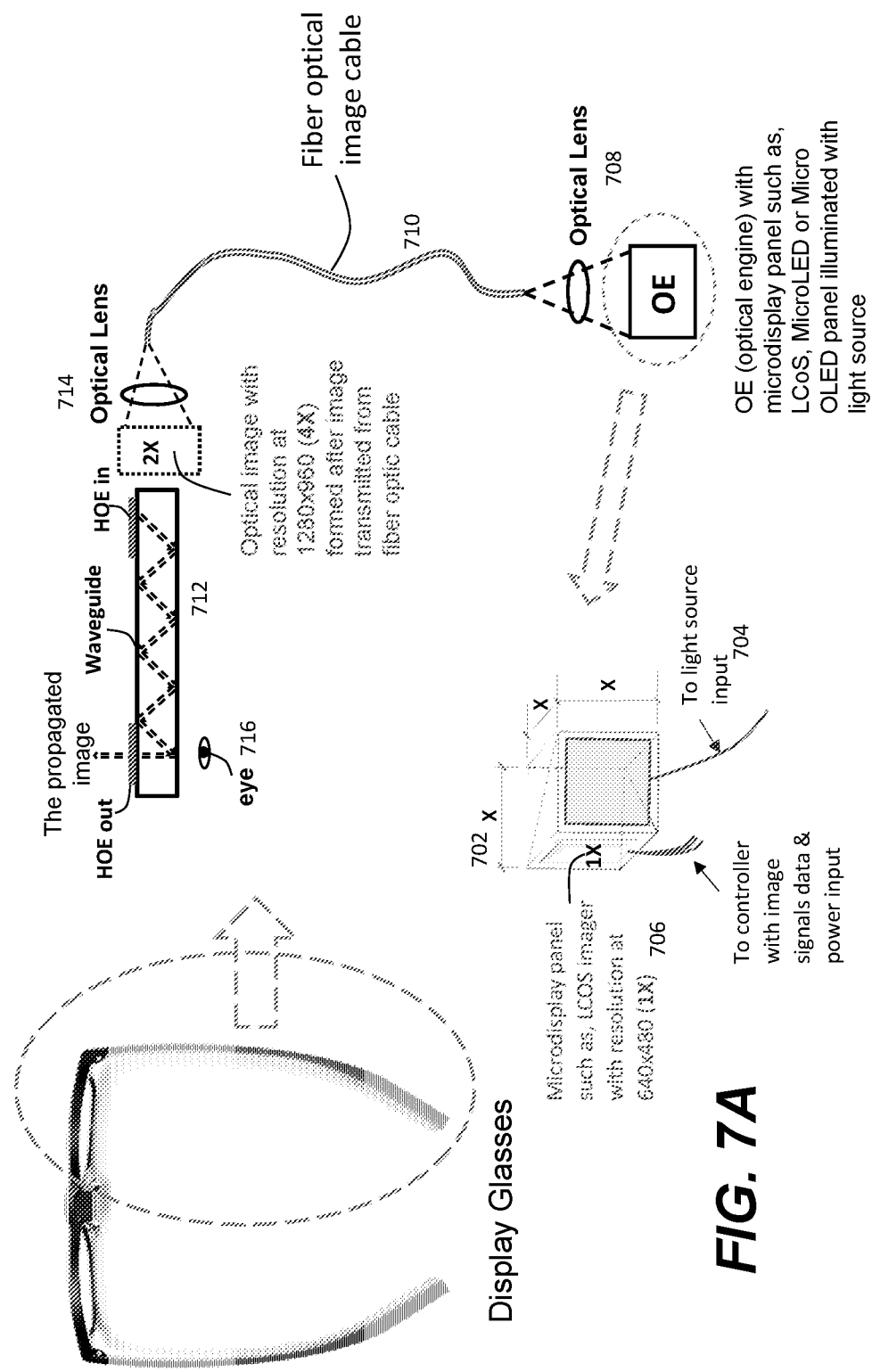
FIG. 7A shows one embodiment of how an optical image is generated using an optical cube.
Figure 7B:
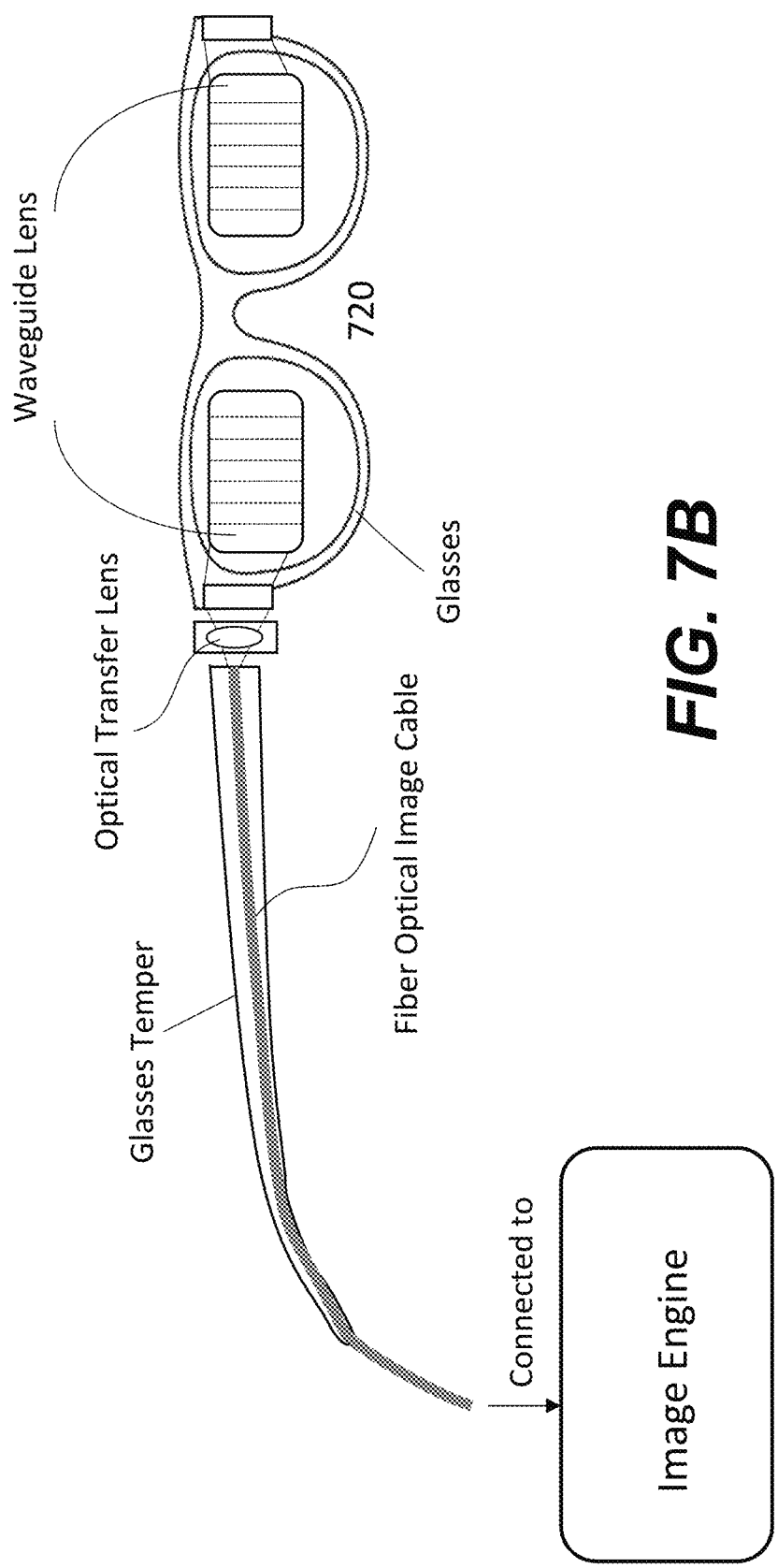
FIG. 7B shows that the display glasses do not include any other power-driven electronic parts to provide an image or video to the integrated lens.

Referring now to FIG. 7A, it shows one embodiment how an optical image is generated using an optical cube 702. With a light source 704, the image displayed on a microdisplay (e.g., LCoS or OLED) 706 is projected as an optical image picked up by a lens 708. The optical image is then transported via the optical fibers 710 to another end thereof. The optical image is then projected into a waveguide or integrated lens 712 via another lens (e.g., collimator) 714. The optical image is eventually seen by a human eye 716 in the waveguide 712. FIG. 7B shows that the display glasses 720 does not include any other power-driven electronic parts to provide an image or video to the integrated lens.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A display device comprises:
   an eyeglasses frame;
   at least one integrated lens including a light waveguide, wherein the integrated lens is framed in the eyeglasses frame;
   at least one temple attached to the eyeglasses frame; and
   a set of optical fibers having a first end and a second end, the first end receiving a sequence of two-dimensional (2D) optical images projected thereon from a lens deposed before the second end, wherein the 2D optical images are sequentially transported to the second end by total internal reflection within the optical fibers, wherein no other power-driven electronic components are needed in the display device to receive the 2D optical images, deliver the 2D optical images to the integrated lens, and form the 2D optical images in the light waveguide by a viewer looking at the integrated lens.

2. The display device as recited in claim 1, wherein the optical fibers are deposed along the temple.

3. The display device as recited in claim 2, wherein the optical fibers are encapsulated in the temple.

4. The display device as recited in claim 2, wherein the optical fibers are part of the temple.

5. The display device as recited in claim 1, wherein data image to generate the 2D optical images are at first refresh rate and in first resolution, two of the 2D optical images are successively displayed in the integrated lens, resulting in a combined optical image at second refresh rate and in second resolution.

6. The display device as recited in claim 5, wherein the first refresh rate=2× the second refresh rate, and the first resolution=½× the second resolution.

7. The display device as recited in claim 5, wherein two successive 2D optical images from the optical fibers are to produce the combined optical image perceived by a viewer of the display device.

8. A method for a display device, the method comprises:
receiving a sequence of two dimensional (2D) optical images from a set of optical fibers having a first end and a second end, wherein the first end receives the 2D optical images being projected thereon, the second end is coupled to one integrated lens including a light waveguide, wherein the integrated lens is framed in an eyeglasses frame including at least one temple attached to the eyeglasses frame;
transporting the 2D optical images sequentially from the first end to the second end by total internal reflection within the optical fibers; and
projecting the 2D optical images into the light waveguide for a viewer to view the 2D optical images in the light waveguide while looking at the integrated lens, wherein no other power-driven electronic components are needed in the display device to receive the 2D optical images, deliver the 2D optical images to the integrated lens and form the 2D optical images in the light waveguide.

9. The method as recited in claim 8, wherein the optical fibers are deposed along the temple.

10. The method as recited in claim 8, wherein the optical fibers are encapsulated in the temple.

11. The method as recited in claim 8, wherein the optical fibers are part of the temple.

12. The method as recited in claim 8, wherein data image to generate the 2D optical images are at first refresh rate and in first resolution, two of the 2D optical images are successively displayed in the integrated lens, resulting in a combined optical image at second refresh rate and in second resolution.

13. The method as recited in claim 12, wherein the first refresh rate=2× the second refresh rate, and the first resolution=½× the second resolution.

14. The method as recited in claim 12, wherein two successive optical images from the optical fibers are to produce the combined optical image perceived by a viewer of the display device.

* * * * *